United States Patent
Lopez et al.

(10) Patent No.: US 12,162,699 B2
(45) Date of Patent: Dec. 10, 2024

(54) METHOD FOR THE REGULATION OF AN INSTALLATION FOR THE GEOLOGICAL SEQUESTRATION OF CARBON DIOXIDE, SUITABLE FOR RENEWABLE ENERGY SUPPLY

(71) Applicant: TECHNIP ENERGIES FRANCE, Nanterre (FR)

(72) Inventors: Audrey Lopez, Courbevoie (FR); Gauthier Perdu, Courbevoie (FR); Luc Heme De Lacotte, Nanterre (FR); Cyrille Dechiron, Courbevoie (FR); Fabrice Marcel, Courbevoie (FR)

(73) Assignee: TECHNIP ENERGIES FRANCE, Nanterre (FR)

( * ) Notice: Subject to any disclaimer, the term of this patent is extended or adjusted under 35 U.S.C. 154(b) by 173 days.

(21) Appl. No.: 17/863,093

(22) Filed: Jul. 12, 2022

(65) Prior Publication Data

US 2023/0009233 A1    Jan. 12, 2023

(30) Foreign Application Priority Data

Jul. 12, 2021 (FR) ...................................... 2107559

(51) Int. Cl.
*E21B 43/16* (2006.01)
*B65G 5/00* (2006.01)
*E21B 41/00* (2006.01)

(52) U.S. Cl.
CPC ............ *B65G 5/00* (2013.01); *E21B 41/0064* (2013.01)

(58) Field of Classification Search
CPC .... E21B 41/0064; E21B 43/164; E21B 43/40; B65G 5/00; Y02C 20/40
See application file for complete search history.

(56) References Cited

U.S. PATENT DOCUMENTS

| | | | |
|---|---|---|---|
| 5,214,384 | A | 5/1993 | Sprunt et al. |
| 2007/0261844 | A1 | 11/2007 | Cogliandro et al. |
| 2015/0013977 | A1 | 1/2015 | Palmer et al. |
| 2017/0283014 | A1 | 10/2017 | Baker |

FOREIGN PATENT DOCUMENTS

WO    2008076947 A2    6/2008

OTHER PUBLICATIONS

Search Report issued during prosecution of corresponding French Patent Application No. FR2107559 on Mar. 1, 2022.

*Primary Examiner* — Carib A Oquendo
(74) *Attorney, Agent, or Firm* — Locke Lord LLP; Gabrielle L. Gelozin; Christopher J. Capelli

(57) ABSTRACT

A method for the regulation of an installation for the geological sequestration of carbon dioxide includes a structure; a $CO_2$ storage compartment, received in said structure; a device for injecting $CO_2$ into a geological reservoir; an energy production device; and an energy storage device. The energy production device supplies a power that varies over time, between low, intermediate, and high states. When the power supplied is in the low state, the injection device is powered by the energy storage device; and when said power supplied is in the high state, the injection device is powered by the power generation device, to ensure a continuous injection of $CO_2$ into the geological reservoir.

10 Claims, 3 Drawing Sheets

METHOD FOR THE REGULATION OF AN INSTALLATION FOR THE GEOLOGICAL SEQUESTRATION OF CARBON DIOXIDE, SUITABLE FOR RENEWABLE ENERGY SUPPLY

CROSS-REFERENCE TO RELATED APPLICATIONS

This application claims priority to and the benefit of French Patent Application No. FR 21 07559, filed Jul. 12, 2021, the entire contents of which are herein incorporated by reference in their entirety.

BACKGROUND

1. Field of the Invention

The present invention relates to a method for the regulation of an installation for the geological sequestration of carbon dioxide, of the type comprising: a preferably floating structure; a liquid carbon dioxide storage compartment, received in said structure; an injection device, able to inject carbon dioxide into a submarine geological reservoir, from said storage compartment; an energy production device, able to power said injection device; and an energy storage device received in said structure, said storage device also being able to power the injection device.

2. Description of Related Art

The invention applies particularly to offshore installations, as described in US2017/0283014. These installations are intended for the injection of carbon dioxide ($CO_2$) into subaquatic geological reservoirs for sequestration purposes.

The purpose of carbon dioxide sequestration is to reduce greenhouse gas emissions in the atmosphere. It is therefore preferable to supply such installations with non-greenhouse gas emitting energy from renewable sources, such as wind, solar, tidal, or geothermal energy.

The production of renewable energy has the disadvantage of being intermittent, especially depending on climatic conditions. However, depending on the conditions of implementation, the use of a geological reservoir involves risks of hydrate formation in the diffusion channels of said reservoir, and/or the sealing of said channels. In order to reduce such risks and simplify the various operational aspects by avoiding frequent stops/restarts, it is preferable to ensure a continuous injection of carbon dioxide into the reservoir.

SUMMARY

The present invention aims to provide an implementation of an installation for the geological sequestration of carbon dioxide, suitable for an operation based on renewable energies while ensuring a continuous injection with a potentially adaptable flow rate depending on the available energy.

For this purpose, the invention relates to a regulation method of the aforementioned type, wherein: the energy production device supplies a time-variable power, said power supplied being associated with a first and a second defined power threshold, the second threshold being greater than or equal to the first threshold; the power supplied varying between a first weak state, below the first threshold; a second intermediate state, between the first and second threshold; and a third high state, above the second threshold; and when said power supplied is in the first low state, the injection device is powered by the energy storage device; and when said power supplied is in the third high state, the injection device is powered by the energy production device and said energy production device powers the energy storage device in parallel; so as to ensure a continuous injection of carbon dioxide into the underwater geological reservoir from the carbon dioxide storage compartment.

According to other advantageous aspects of the invention, the control method comprises one or more of the following characteristics, taken in isolation or according to all technically possible combinations:

when the injection device is powered by the energy storage device, the injection of carbon dioxide from the storage compartment is implemented at a first flow rate; and when the injection device is powered by the energy production device, said carbon dioxide injection is implemented at a second flow rate greater than the first flow rate;

the installation comprises a tool for forecasting the power supplied by the renewable energy production device; and when said power supplied is in the second intermediate state, the injection of carbon dioxide from the storage compartment is implemented at a third flow rate which is variable over time between the first and second flow rates, depending on forecasts of the tool.

The invention further relates to an installation for the geological sequestration of carbon dioxide, said installation comprising: a structure; a liquid carbon dioxide storage compartment, received in said structure; an injection device, able to inject carbon dioxide into an underwater geological reservoir, from said storage compartment; an energy production device, able to power said injection device; and an energy storage device received in said structure, said storage device also being able to power the injection device; the installation being provided with means of implementing a management method as described above, so as to ensure a continuous injection of carbon dioxide into the underwater geological reservoir from the storage compartment.

According to other advantageous aspects of the invention, the installation comprises one or more of the following characteristics, taken in isolation or according to all technically possible combinations:

the energy storage device comprises a hydraulic energy storage device;

the energy storage device comprises a device for storing pressurized carbon dioxide;

the energy storage unit comprises an electrical storage battery;

the energy production device is received on the structure;

the energy production device is external to the structure;

the energy production device is powered by a renewable energy source, preferably chosen from wind, solar, tidal, and geothermal energy.

BRIEF DESCRIPTION OF THE DRAWINGS

The invention will be better understood by reading the following description, given only as a non-limiting example and made with reference to the drawings, in which.

DETAILED DESCRIPTION

Figure 1:
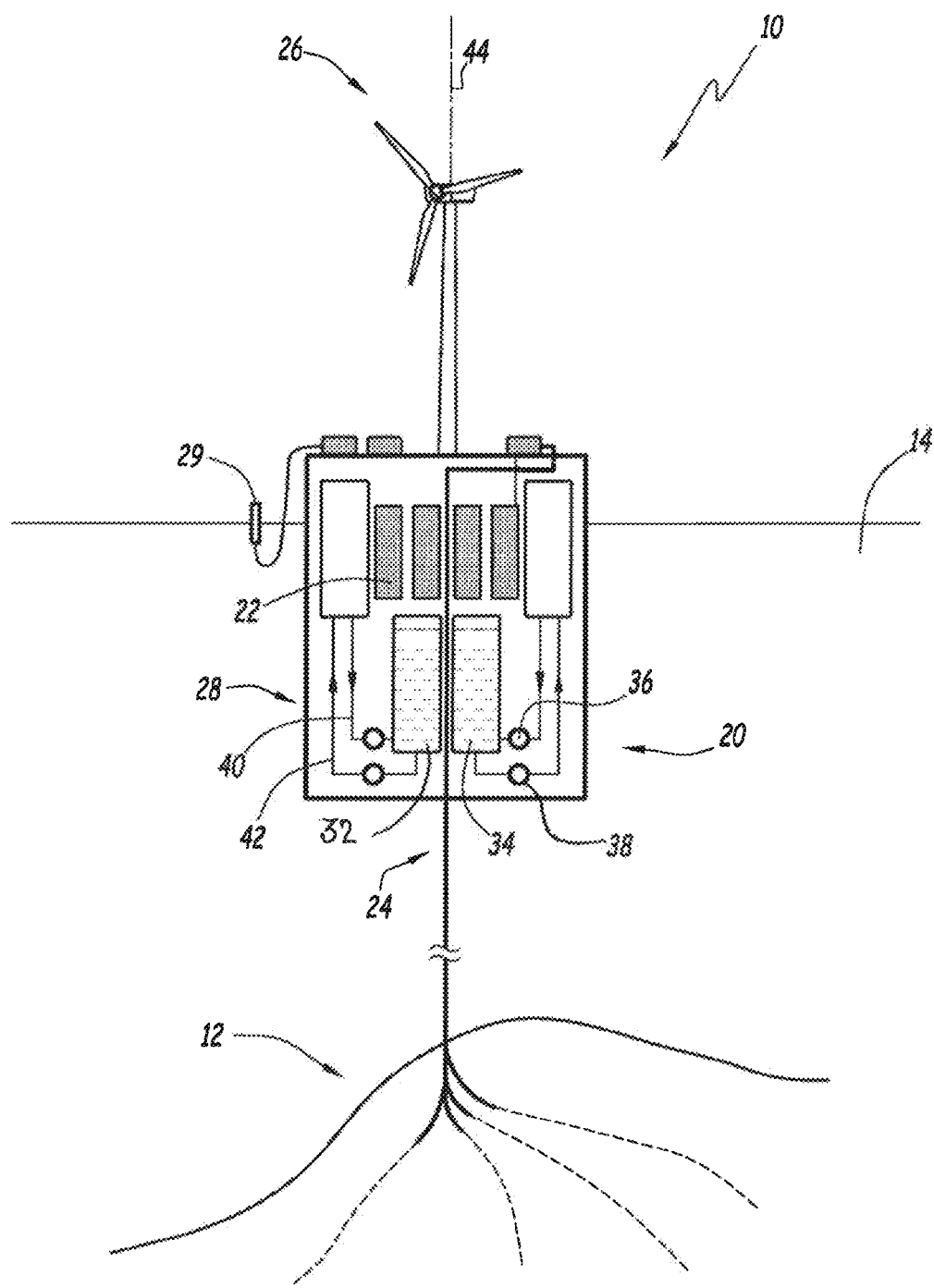
FIGS. 1, 2, and 3 are schematic representations of installations for the geological sequestration of carbon dioxide, according to respectively a first, a second, and a third embodiment of the invention, respectively.
Figure 2:
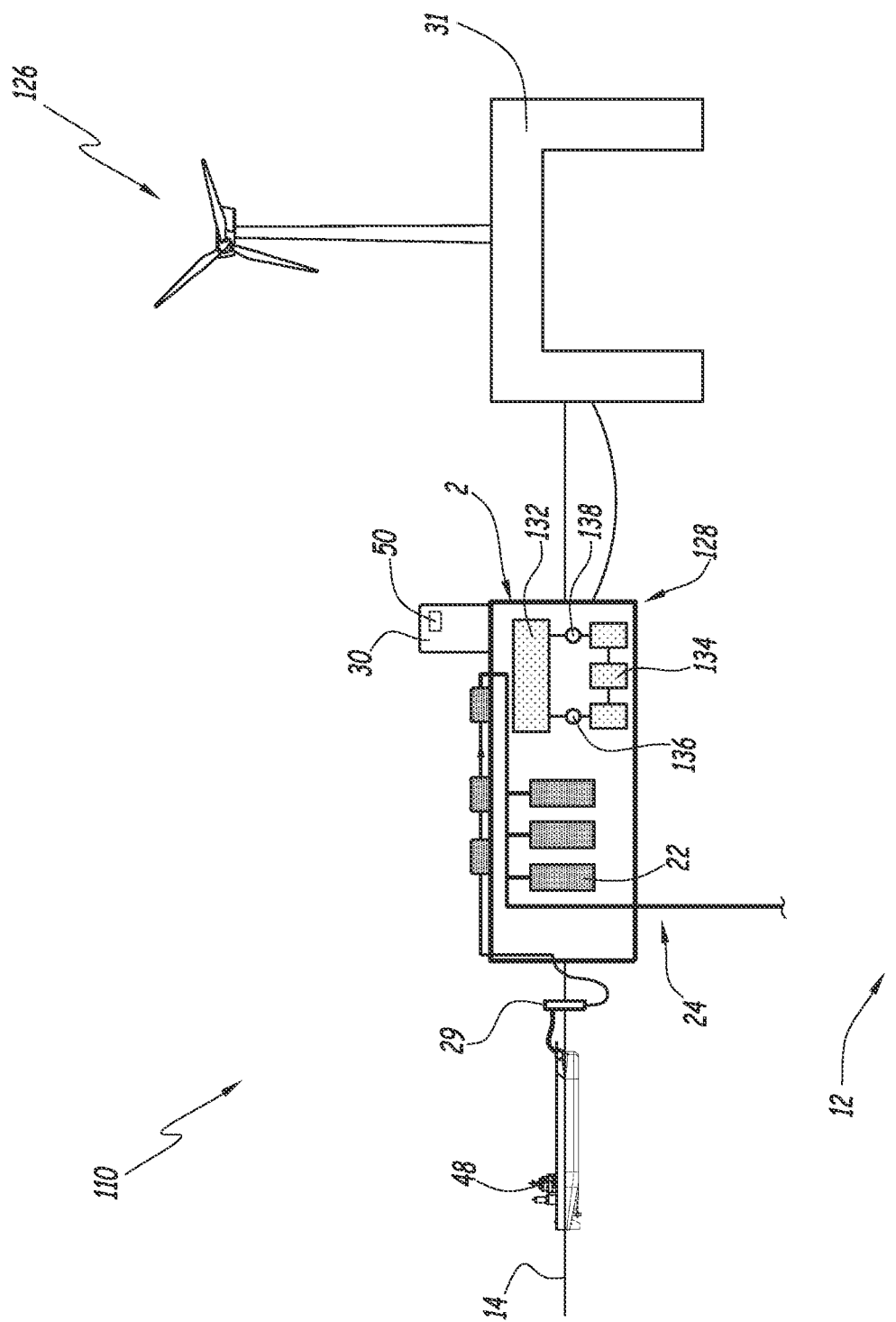
Figure 3:
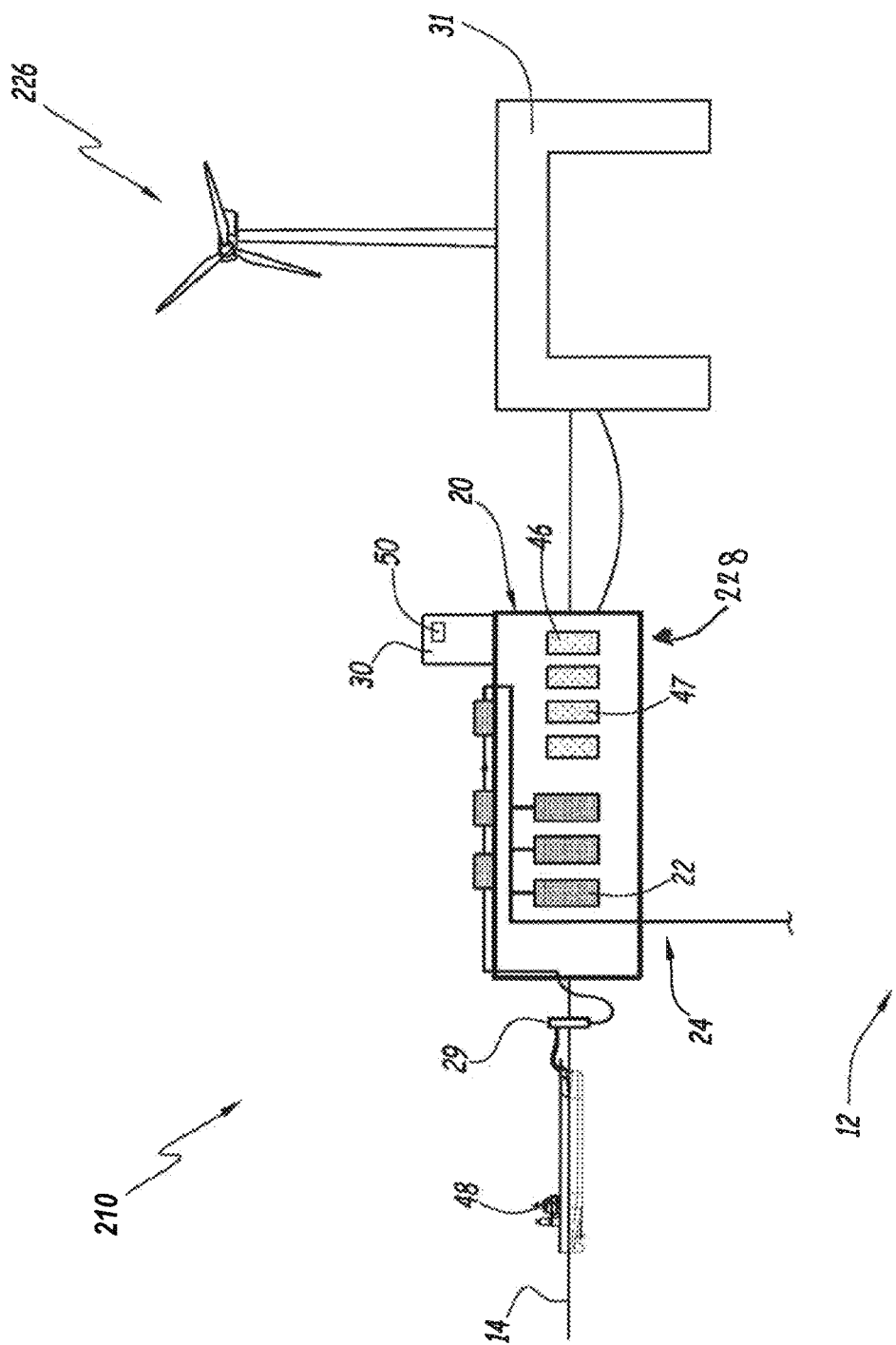

Each of FIGS. 1, 2, and 3 shows an installation 10, 110, 210 for the geological sequestration of carbon dioxide, according to a first, a second, and a third embodiment of the invention, respectively.

More specifically, each of the installations 10, 110, 210 is able to inject carbon dioxide into a submarine geological reservoir 12, as can be seen in FIG. 1. "Submarine" means that geological reservoir 12 is located in soil covered by the sea 14 or, alternatively, by a body of fresh water such as a lake.

The installations 10, 110, and 210 will be described simultaneously below, the common elements being designated by the same reference numbers.

The installation 10, 110, 210 comprises: a structure 20, floating on or immersed in a body of water; a carbon dioxide storage compartment 22; an injection device 24; an energy production device 26, 126, 226; an energy storage device 28, 128, 228; and a device 29 for connecting and for discharging liquid $CO_2$.

The installation 10, 110, 210 comprises an electronic regulation module 30, as can be seen in FIGS. 2 and 3.

In the embodiments shown, the structure 20 is intended in particular to be installed so as to float on the body of water, such as the sea 14, covering the geological reservoir 12. The structure 20 can be floating, such as a Single Point Anchor Reservoir (SPAR), or a semi-submersible platform or a ship hull. In one variant (not shown), the structure 20 can be placed directly on the bottom of a body of water, such as a Gravity Base Structure (GBS) or a jack-up lattice structure Alternatively, the floating structure 20 is a liquid $CO_2$ transporter.

The compartment 22 is received in the structure 20. The compartment 22 is able to store liquid carbon dioxide. In the embodiments shown, the installation 10, 110, 210 comprises a plurality of compartments 22 received in the structure 20.

The injection device 24 is received in the structure 20. The injection device 24 is able to inject carbon dioxide into the submarine geological reservoir 12, from the storage compartment(s) 22.

In particular, the injection device 24 is provided with means of: drawing liquid $CO_2$ from the storage compartment(s) 22; conditioning said $CO_2$, in particular the temperature and pressure thereof, to a desired state; and sending said conditioned $CO_2$ into the geological reservoir 12.

As will be described in more detail below, the installation 10, 110, 210 is designed such that the injection device 24 performs a continuous injection of carbon dioxide into the geological reservoir 12 from the storage compartment 22. "Continuous injection" means that the injection rate from the injection device 24 to the geological reservoir 12 is strictly above zero at all times.

The energy production device 26, 126, 226 is able to power the injection device 24.

In the first embodiment, the power generation device 26 of the installation 10 is located on the structure 20. In the second and third embodiments, the energy production device 126, 226 of the installation 110, 210 is located on an annex structure 31, separate from the structure 20. In a variant of the second and third embodiments, the energy production device of the installation is located on the structure.

Preferably, the energy production device 26, 126, 226 is powered by a renewable energy source. In the embodiments shown, the energy production device 26, 126, 226 is a wind turbine, able to produce energy from the wind. Alternatively, the renewable energy source is solar energy, or tidal energy, or geothermal energy.

The energy storage device 28, 128, 228 is received in the floating structure 20.

The energy storage unit 28, 128, 228 is able to power the injection device 24. In addition, the energy storage device 28, 128, 228 is able to be powered by the energy production device 26, 126, 226.

In the first embodiment, the energy storage unit 28 is based on the energy accumulated by a difference in gravity between two reservoirs located at a different height. The transfer allows the restitution by transformation of the gravitational potential energy and the production of hydraulic energy. More precisely, the device 28 comprises: a first 32 and a second 34 reservoir, a hydraulic turbine 36, and a pump 38.

The first reservoir 32 is vertically located higher than the second reservoir 34 in the floating structure 20. The first 32 and second 34 reservoir are in hydraulic communication via a first 40 and a second 42 circuit. The hydraulic turbine 36 and the pump 38 are located on the first 40 and the second 42 circuit, respectively.

The first 32 and second 34 reservoir and the first 40 and second 42 circuit are able to receive a fluid, preferably a liquid, such as water.

The hydraulic turbine 36 is able to supply energy to the injection device 24. The pump 38 is able to receive energy from the production device 26.

In the embodiment shown in FIG. 1, the device 28 comprises a plurality of sub-assemblies, each of said sub-assemblies comprising a first 32 and a second 34 reservoir, a hydraulic turbine 36, and a pump 38, as described above. The sub-assemblies are distributed angularly around a vertical main axis 44 of the floating structure 20, such that hydraulic transfers do not disturb the balance of said structure.

In the second embodiment, the energy storage device 128 is based on the energy of a fluid stored under high pressure. More specifically, the device 128 comprises: a third 132 and a fourth 134 reservoir including one or more storage units, a turbine system 136, and a compressor system 138.

The third reservoir 132 is able to store carbon dioxide at high pressure. In one embodiment of the invention, the $CO_2$ is under conditions of temperature and pressure which define a supercritical fluid state. The fourth reservoir 134 is able to store liquid carbon dioxide at reduced pressure.

The third 132 and fourth 134 reservoir are in fluid communication via a closed cycle. The turbine system 136 and the compressor system 138 are located on the closed cycle.

The turbine system 136 is able to supply energy to the injection device 24 by lowering the pressure of the $CO_2$ taken from the reservoir 134, and delivering thermodynamic work with high efficiency. The compressor system 138 is able to receive energy from the production device 126 to store energy in the reservoir 132. The compression and expansion of $CO_2$ changes the temperature, and each of the cycles is provided with heat exchange devices to maintain the temperature.

In the third embodiment, the energy storage device 228 consists of an electric battery 46 or an assembly of electric batteries 46. The battery/batteries 46 is/are able to supply energy to the injection device 24 and able to receive energy from the production device 226.

Optionally, the energy storage unit 28, 128, 228 also has a booster element, such as a booster battery 47 shown in FIG. 3. The booster element is intended to store energy from a source other than the production device 26, 126, 226.

The coupling device 29 is able to be attached to a $CO_2$ carrier ship 48, shown in FIGS. 2 and 3, in order to receive carbon dioxide on the floating structure 20.

In the embodiments shown, the electronic regulation module 30 is received in the floating structure 20. In one variant (not shown), the electronic module 30 is located in a control center external to the floating structure 20.

The electronic module 30 is provided with means, such as a computer program, of implementing a method for regulating the installation 10, 110, 210. The purpose of said method is to maintain a continuous injection of carbon dioxide into the geological reservoir 12 from the storage compartment 22.

The regulation method takes into account the time-variable aspect of the power supplied by the energy production device 26, 126, 226, based on a renewable energy source. In particular, the electronic module 30 is able to measure over time the power P provided by the energy production device 26, 126, 226.

According to the regulation method, the power P supplied is associated with a first P1 and a second P2 defined power threshold. The second threshold is greater than or equal to the first threshold.

Preferably, the second power threshold P2 is strictly greater than the first threshold P1. Alternatively, the first and second thresholds are equal, i.e., there is only one defined power threshold. In the rest of the description, the second threshold P2 is considered to be strictly greater than the first threshold P1.

According to the regulation method, the power P supplied by the production device 26, 126, 226 varies over time between a first weak state, below the first threshold P1; a second intermediate state, between the first P1 and second P2 threshold; and a third high state, greater than the second threshold.

For example, in the case where the production device 26, 126, 226 is a wind turbine, the first weak state corresponds to a weak or zero wind; and the third high state corresponds to a strong wind, allowing good performance of said wind turbine.

According to one embodiment, the first weak state also corresponds to the cases of winds too strong to allow safe operation of the wind turbine, said wind turbine then being shut down.

When the power P supplied by the production device 26, 126, 226 is in the first low state below P1, the injection device 24 is powered by the energy storage device 28, 128, 228; and the injection of carbon dioxide from storage compartment 22 is implemented at a non-zero first flow rate D1.

Preferably, D1 is chosen as being greater than a minimum value compatible with the injection equipment while ensuring the objective of minimizing the number of shutdowns and restarts of the installation for a given energy storage size.

When the power P supplied by the production device 26, 126, 226 is in the third high state greater than P2, the injection device 24 is powered by said energy production device 26, 126, 226. The injection of carbon dioxide from the storage compartment 22 is then implemented at a second flow rate D2, greater than the first flow rate D1.

Said energy production device powers the storage device 28, 128, 228 in parallel until said storage device reaches a maximum capacity of stored energy.

The case where the power P supplied by the production device 26, 126, 226 is in the second intermediate state, between P1 and P2, will now be considered.

Preferably, the electronic module 30 is provided with, or associated with, a tool 50 (FIG. 2) for forecasting the variation of the power P supplied. For example, the tool 50 comprises a sensor or set of weather sensors, as well as software to predict future weather conditions based on the information obtained by the sensor(s). In the embodiments shown, the forecasting tool 50 makes it possible to anticipate wind variations near the wind turbine forming the production device 26, 126, 226.

Preferably, the forecasting tool 50 is also able to predict a quantity of $CO_2$ available for injection over a given period of time. For example, the tool 50 comprises software to calculate said quantity based on information related to an initial state of the $CO_2$ stock and quantities of deliveries planned on the structure 20. Such a forecast makes it possible in particular to reduce the injection rate before a possible exhaustion of the stock of $CO_2$ to be injected.

Preferably, the computer program of the electronic module 30 is defined so as to share the power P supplied by the production device 26, 126, 226 in the second intermediate state, according to the forecasts of the tool 50. For example, said program defines a flow rate D3, variable over time between D1 and D2, according to said forecasts of the tool 50. Said flow rate D3 mobilizes some of the power P, the rest of said power being used for energy storage by the storage device 28, 128, 228.

Alternatively, in the second intermediate state, the computer program of the electronic module 30 defines the carbon dioxide injection rate at a constant value D3, between D1 and D2.

According to one embodiment, the computer program of the electronic module 30 provides several of the above possibilities of managing the second intermediate state, a choice between these possibilities being configurable by an operator at the electronic module 30.

Preferably, the computer program of the electronic module 30 reserves the use of the booster battery 47 for managing extreme situations, when the energy storage proves insufficient or ineffective, always in the context of the search for injection continuity.

According to one variant (not shown) of the embodiments described above, the installation 10, 110, 210 further comprises at least one pressurization balloon connected to the carbon dioxide storage compartment 22. According to said variant, when the power P supplied is in the second or third state, $CO_2$ is vaporized from said compartment 22 and pressurized in said at least one pressurization balloon.

A case in which the power P supplied is in the first weak state and the installation 10, 110, 210 has insufficient stored energy to maintain the first flow rate D1 will be considered next.

In this case, according to one variant of the invention, the injection device 24 injects the pressurized $CO_2$ to the geological reservoir 12 from said pressurization balloon, thanks to the free flow principle. Such a variant makes it possible to maintain a reduced but not zero injection rate, despite the exhaustion of the energy available in the installation.

Thus, the installation 10, 110, 210 ensures a continuous injection of $CO_2$, at a variable flow rate, preferably beyond a minimum value to ensure the objective of minimizing the number of shutdowns and restarts.

Such continuity of the injection makes it possible to maximize the performance of the geological reservoir 12, while allowing a renewable energy supply, so as to optimize the carbon footprint of the installation.

The invention claimed is:

1. Regulation method of an installation for the geological sequestration of carbon dioxide, said installation comprising:

a structure;

a liquid carbon dioxide storage compartment, received in said structure;

an injection device, able to inject carbon dioxide into a submarine geological reservoir, from said storage compartment;

an energy production device, able to power said injection device; and an energy storage device, received in said structure, said storage device also being able to power the injection device;

the method comprising:

the energy production device supplies a time-variable power (P), said power supplied being associated with a first (P1) and a second (P2) defined power threshold, the second threshold being greater than or equal to the first threshold; the power supplied varying between a first weak state, below the first threshold (P1); a second intermediate state, between the first and second thresholds; and a third high state, greater than the second threshold (P2);

when the power supplied is in the first low state, the injection device is powered by the energy storage device; and when said power supplied is in the third high state, the injection device is powered by the energy production device and said energy production device powers the storage device in parallel;

so as to ensure a continuous injection of carbon dioxide into the submarine geological reservoir from the storage compartment.

2. Regulation method according to claim 1, wherein, when the injection device is powered by the energy storage device, the injection of carbon dioxide from the storage compartment is implemented at a first flow rate (D1); and when the injection device is powered by the energy production device, said injection of carbon dioxide is implemented at a second flow rate (D2), greater than the first flow.

3. Regulation method according to claim 2, wherein
the installation comprises a tool for forecasting the power (P) supplied; and
when said power (P) supplied is in the second intermediate state, the injection of carbon dioxide from the storage compartment is implemented at a third flow rate (D3) which is variable over time between the first and second flow rates, depending on the forecasts of the tool.

4. Installation for the geological sequestration of carbon dioxide, said installation comprising:

a structure;

a liquid carbon dioxide storage compartment, received in said structure;

an injection device, able to inject carbon dioxide into a submarine geological reservoir from said storage compartment;

an energy production device, able to power said injection device; and an energy storage device, received in said structure, said storage device also being able to power the injection device;

the installation being provided with means of implementing the regulation method according to any of the preceding claims, so as to ensure a continuous injection of carbon dioxide into the submarine geological reservoir from the storage compartment.

5. Installation according to claim 4, wherein the energy storage device comprises a hydraulic energy storage device.

6. Installation according to claim 4, wherein the energy storage device comprises a device for storing pressurized carbon dioxide.

7. Installation according to claim 4, wherein the energy storage device comprises an electrical storage battery.

8. Installation according to claim 4, wherein the energy production device is received on the structure.

9. Installation according to claim 4, wherein the energy production device is external to the structure.

10. Installation according to claim 4, wherein the energy production device is powered by a renewable energy source.

* * * * *